(12) United States Patent
Steensma et al.

(10) Patent No.: US 9,873,795 B2
(45) Date of Patent: Jan. 23, 2018

US009873795B2

(54) PROCESS FOR PREPARING A FIBER-REINFORCED COMPOSITE MATERIAL

(71) Applicant: Akzo Nobel Chemicals International B.V., Amersfoort (NL)

(72) Inventors: Maria Steensma, Arnhem (NL); Johannes Martinus Gerardus Maria Reijnders, Epe (NL); Albert Roland Zuijderduin, Joure (NL); Susana Gomes Santana, Utrecht (NL); Auke Gerardus Talma, Bathmen (NL)

(73) Assignee: AKZO NOBEL CHEMICALS INTERNATIONAL B.V., Arnhem (NL)

(*) Notice: Subject to any disclaimer, the term of this patent is extended or adjusted under 35 U.S.C. 154(b) by 61 days.

(21) Appl. No.: 14/761,137

(22) PCT Filed: Jan. 27, 2014

(86) PCT No.: PCT/EP2014/051463
§ 371 (c)(1),
(2) Date: Jul. 15, 2015

(87) PCT Pub. No.: WO2014/118101
PCT Pub. Date: Aug. 7, 2014

(65) Prior Publication Data
US 2015/0322264 A1    Nov. 12, 2015

Related U.S. Application Data

(60) Provisional application No. 61/760,818, filed on Feb. 5, 2013.

(30) Foreign Application Priority Data

Jan. 29, 2013    (EP) .................................... 13153074

(51) Int. Cl.
*C08L 97/02* (2006.01)
*C08L 45/00* (2006.01)
*C08J 5/04* (2006.01)
*C08J 5/10* (2006.01)
*C08K 5/00* (2006.01)

(52) U.S. Cl.
CPC ............... *C08L 97/02* (2013.01); *C08J 5/045* (2013.01); *C08J 5/10* (2013.01); *C08K 5/0025* (2013.01); *C08L 45/00* (2013.01); *C08J 2333/06* (2013.01); *C08J 2363/10* (2013.01); *C08J 2367/06* (2013.01)

(58) Field of Classification Search
CPC .................................. C08L 97/02; C08L 45/00
USPC ............................................................ 524/9
See application file for complete search history.

(56) References Cited

U.S. PATENT DOCUMENTS

| | | | |
|---|---|---|---|
| 4,487,797 A | 12/1984 | Watson | |
| 2005/0136256 A1* | 6/2005 | Vichniakov | ................. 428/375 |
| 2009/0321981 A1* | 12/2009 | Hopkins | ................. C08L 97/02 264/128 |
| 2010/0266792 A1* | 10/2010 | Pfistner et al. | ............. 428/35.6 |
| 2011/0263756 A1 | 10/2011 | Yano et al. | |
| 2012/0252930 A1* | 10/2012 | Kobayashi | ........... C08F 283/10 523/400 |
| 2013/0062806 A1* | 3/2013 | Mitadera | ................... C08J 5/04 264/129 |

FOREIGN PATENT DOCUMENTS

| | | |
|---|---|---|
| EP | 2 094 754 B1 | 3/2010 |
| GB | 972078 | 10/1964 |
| JP | 2003049001 A | 2/2003 |
| JP | 2011256218 A | 12/2011 |
| WO | 2011083309 A1 | 7/2011 |
| WO | 2012/079624 A1 | 6/2012 |
| WO | WO 2012/140785 | * 10/2012 |
| WO | 2014/032710 A1 | 3/2014 |
| WO | 2014/095670 A1 | 6/2014 |

OTHER PUBLICATIONS

English Abstract of JP2011256218.
English Abstract of JP2003049001.
Search Report of corresponding EP Application Serial No. 13153074.3, dated Jun. 24, 2013.
Search Report of corresponding International Application Serial No. PCT/EP2014/051463, dated May 19, 2014.
Stevulova et al., "Lightweight Composites Based on Rapidly Renewable Natural Resource", AIDIC, 2013, vol. 35, 589-594.

* cited by examiner

*Primary Examiner* — Deve E Valdez
(74) *Attorney, Agent, or Firm* — McDonnell Boehnen Hulbert & Berghoff LLP

(57) ABSTRACT

Process for the preparation of a fiber-reinforced composite material comprising the step of contacting (i) a radically curable resin, (ii) fibers with a total water content of 0.5-20 wt %, based on the total weight of fibers, (iii) at least one transition metal compound selected from manganese, iron, and copper compounds, and (iv) a peroxide.

7 Claims, No Drawings

PROCESS FOR PREPARING A FIBER-REINFORCED COMPOSITE MATERIAL

This application is a national stage filing under 35 U.S.C. § 371 of PCT/EP2014/051463, filed Jan. 27, 2014, which claims priority to U.S. Provisional Patent Application No. 61/760,818, filed Feb. 5, 2013, and European Patent Application No. 13153074.3, filed Jan. 29, 2013, the contents of which are each incorporated herein by reference in their entireties.

The present invention relates to a process for preparing a fibre-reinforced composite material and to radically curable compositions comprising fibres.

Polymer-based materials can be reinforced with fibres in order to add rigidity and impede crack propagation. Thin fibres can have very high strength and, provided they are mechanically well attached to the matrix, they can greatly improve the composite's overall properties.

There are two main categories of fibre-reinforced composite materials: short fibre-reinforced materials and continuous fibre-reinforced materials. Continuous reinforced materials often constitute a layered or laminated structure. The woven and continuous fibre styles are typically available in a variety of forms, being impregnated with the resin.

The short fibres are typically employed in compression moulding and sheet moulding operations. They have the form of flakes, chips, or random mate. Common fibres used for reinforcement include glass fibres, carbon fibres, cellulose fibres (wood fibre, paper fibre, straw), high-strength polymers such as aramid, and natural fibres.

Redox systems are generally applied in resin cure. Conventional redox systems comprise an oxidizing agent (e.g. a peroxide) and a soluble transition metal ion as accelerator. The accelerator serves to increase the activity of the oxidizing agent at lower temperatures and, consequently, to speed up the curing rate.

Typical accelerator systems comprise a transition metal salt or complex. The transition metal most frequently used for this purpose is cobalt.

Cobalt-based redox systems work very well in water-free systems. However, as soon as the resin composition contains significant amounts of water, the curing adversely affected, resulting in long gel times and low peak exotherms. This means that all fibres must be completely dry before their use in preparing fibre-reinforced composites. Fibres which attract water from the atmosphere and water-containing (natural) fibres thus have to be dried completely before use and even need to be used under a dry atmosphere.

It has now surprisingly been found that redox systems based on Cu, Mn, and/or Fe compounds work well in the presence of water-containing fibres. What is more, the use of this curing system in combination with water-containing fibres leads to significantly improved properties of the resulting fibre-reinforced composite material—e.g. increased strength, reduced stiffness, and better shock adsorption—compared to composites made from dry fibres or dry Co-based systems.

The invention therefore relates to a process for the preparation of a composite material comprising the step of contacting (i) a radically curable resin, (ii) fibres with a total water content of 5-20 wt %, based on the total weight of fibres, (iii) at least one transition metal compound selected from manganese, iron, and copper compounds, and (iv) a peroxide.

The invention also relates to a radically curable composition comprising (i) a radically curable resin, (ii) fibres with a total water content of 0.5-20 wt %, based on the total weight of fibres, and (iii) at least one transition metal compound selected from manganese, iron, and copper compounds.

The invention further relates to a two-component composition comprising said radically curable composition (component A) and a peroxide (component B) as separate components which can be mixed to initiate the cure.

Suitable resins to be cured according to the invention include alkyd resins, unsaturated polyester (UP) resins, vinyl ester resins, (meth)acrylate resins. Preferred resins are (meth)acrylate resins, UP resins, and vinyl ester resins.

The radically curable resin may be combined with other types of resins, such as epoxy resins. A preferred resin combination that can be used in the process of the present invention is a combination of a UP resin and an epoxy resin.

In the context of the present application, the terms "unsaturated polyester resin" and "UP resin" refer to the combination of unsaturated polyester resin and ethylenically unsaturated monomeric compound. The term "vinyl ester resin" refers to a resin produced by the esterification of an epoxy resin with an unsaturated monocarboxylic acid, and dissolved in an ethylenically unsaturated monomeric compound (e.g. styrene). UP resins and vinyl ester resins as defined above are common practice and commercially available.

Suitable UP resins to be cured by the process of the present invention are so-called ortho-resins, iso-resins, iso-npg resins, and dicyclopentadiene (DCPD) resins. Examples of such resins are maleic, fumaric, allylic, vinylic, and epoxy-type resins, bisphenol A resins, terephthalic resins, and hybrid resins.

Acrylate and methacrylate resins without an additional ethylenically unsaturated monomeric compound like styrene are referred to in this application as (meth)acrylate resins.

Examples of suitable ethylenically unsaturated monomers to be present in UP and vinyl ester resins include styrene and styrene derivatives like α-methyl styrene, vinyl toluene, indene, divinyl benzene, vinyl pyrrolidone, vinyl siloxane, vinyl caprolactam, stilbene, but also diallyl phthalate, dibenzylidene acetone, allyl benzene, methyl methacrylate, methylacrylate, (meth)acrylic acid, diacrylates, dimethacrylates, acrylamides, vinyl acetate, triallyl cyanurate, triallyl isocyanurate, allyl compounds which are used for optical application (such as (di)ethylene glycol diallyl carbonate), chlorostyrene, tert-butyl styrene, tert-butylacrylate, butanediol dimethacrylate, bismaleimides, biscitraconimides, bisitaconimides, monoitaconimides, monocitraconimides, monocitraconimides containing a functional group (e.g. an additional unsaturated functionality, for example n-allylcitraconimides), and mixtures thereof. Suitable examples of (meth)acrylate reactive diluents are PEG200 di(meth)acrylate, 1,4-butanediol di(meth)acrylate, 1,3-butanediol di(meth)acrylate, 2,3-butanediol di(meth)acrylate, 1,6-hexanediol di(meth)acrylate and its isomers, diethylene glycol di(meth)acrylate, triethylene glycol di(meth)acrylate, glycerol di(meth)acrylate, trimethylol propane di(meth)acrylate, neopentyl glycol di(meth)acrylate, dipropylene glycol di(meth)acrylate, tripropylene glycol di(meth)acrylate, PPG250 di(meth)acrylate, tricyclodecane dimethylol di(meth)acrylate, 1,10-decanediol di(meth)acrylate, tetraethylene glycol di(meth)acrylate, trimethylol propane tri(meth)acrylate, glycidyl (meth)acrylate, and mixtures thereof.

The amount of ethylenically unsaturated monomer to be used is preferably at least 0.1 wt %, based on the weight of the resin, more preferably at least 1 wt %, and most preferably at least 5 wt %. The amount of ethylenically unsaturated monomer is preferably not more than 50 wt %, more preferably not more than 40 wt %, and most preferably not more than 35 wt %.

The fibres introduced in the composite material serve as reinforcement. Examples of suitable fibres are glass fibres, nylon fibres, polyester fibres, aramid fibres (e.g. Twaron®), and natural fibres (e.g. jute, kenaf, industrial hemp, flax (linen), ramie, bamboo, etc.).

The fibres may contain a sizing agent or another additive to improve adhesion, such as a silane.

The total water content of the fibres used in accordance with the present invention is 0.5-20 wt %, preferably 2-20 wt %, more preferably 5-15 wt %, based on the total weight of the wet fibres. The water content of the fibres can be determined by drying a sample of the fibres for 1 hour in a hot air stove at 105° C. and determining the weight loss.

The fibres are preferably used in accordance with the present invention in an amount of 1-60 wt %, more preferably 10-50 wt %, even more preferably 15-40 wt %, more preferably 20-40 wt %, and most preferably 20-30 wt %, based on the weight of the resin.

Examples of suitable transition metal compounds are salts and complexes of iron, copper, or manganese, and combinations of such compounds. Copper and iron are the most preferred transition metals. Even more preferred are copper and a combination of copper and iron.

Suitable manganese, copper, and iron compounds are their halides, nitrates, sulphates, sulphonates, phosphates, phosphonates, oxides, carboxylates, and complexes of these metals with a ligand. Examples of suitable carboxylates are lactate, 2-ethyl hexanoate, acetate, proprionate, butyrate, oxalate, laurate, oleate, linoleate, palmitate, stearate, acetyl acetonate, octanoate, nonanoate, heptanoate, neodecanoate, or naphthenate. Examples of ligands are pyridine and the tridentate, tetradentate, pentadentate, and hexadentate nitrogen donor ligands disclosed in WO 2011/83309.

Preferred manganese compounds are manganese chloride, nitrate, sulphate, lactate, 2-ethyl hexanoate, octanoate, nonanoate, heptanoate, neodecanoate, naphthenate, and acetate, and the Mn complexes of pyridine, porphirine-based ligands, and of the tridentate, tetradentate, pentadentate, or hexadentate nitrogen donor ligands disclosed in WO 2011/83309. Any one of Mn(II), Mn(III), Mn(IV), and Mn(VII) compounds can be used.

Preferred copper compounds are copper chloride, nitrate, sulphate, lactate, 2-ethyl hexanoate, octanoate, nonanoate, heptanoate, neodecanoate, naphthenate, and acetate. Both Cu(I) and Cu(II) compounds can be used.

Preferred iron compounds are iron chloride, nitrate, sulphate, lactate, 2-ethyl hexanoate, octanoate, nonanoate, heptanoate, neodecanoate, naphthenate, acetate, and iron complexes of pyridine, porphirine-based ligands, or the tridentate, tetradentate, pentadentate, or hexadentate nitrogen donor ligands of WO 2011/83309. Both Fe(II) and Fe(III) can be used. More preferably, it is an iron(II) or iron(III) complex of a tridentate or pentadentate nitrogen donor ligand according to WO 2011/83309.

Preferred nitrogen donor ligands according to WO 2011/83309, for both Mn and Fe, are the bispidon ligands and the TACN-Nx ligands. The preferred bispidon ligand is dimethyl-2,4-di-(2-pyridyl)-3-methyl-7-(pyridin-2-ylmethyl)-3,7-diaza-bicyclo[3.3.1]nonan-9-one-1,5-dicarboxylate (N2py3o-Cl). The preferred TACN-Nx ligand is 1,4,7-trimethyl-1,4,7-triazacyclononane ($Me_3$-TACN).

The total amount of transition metal selected from iron, manganese, copper, and mixtures thereof to be used in the process and compositions according to the present invention is preferably 0.5-75 mmol/kg resin, more preferably 2-50 mmol/kg, even more preferably 2-25 mmol/kg, and most preferably 2-10 mol/kg resin.

In addition to the transition metal selected from iron, manganese, copper, and combinations thereof, one or more additional transition metal compounds may be present in the radically curable composition of the present invention. Examples of suitable metals are cobalt, titanium, vanadium, tin, chromium, nickel, molybdenum, germanium, strontium, palladium, platinum, niobium, antimony, rhenium, osmium, iridium, platinum, gold, mercury, tellurium, rubidium, and/or bismuth compounds.

Cobalt compounds are the least preferred because of the legislative and toxicity problems involved with that metal.

In a preferred embodiment, no transition metal compounds other than iron, manganese, and/or copper compounds are used in the process of the present invention.

In a preferred embodiment, an alkali or alkaline earth metal compound, a phosphorous-containing compound, and/or a 1,3-diketone can be used in the process of the present invention.

Examples of 1,3-diketones are acetyl acetone, benzoyl acetone, and dibenzoyl methane, and acetoacetates such as diethyl acetoacetamide, dimethyl acetoacetamide, dipropyl acetoacetamide, dibutyl acetoacetamide, methyl acetoacetate, ethyl acetoacetate, propyl acetoacetate, and butyl acetoacetate.

Examples of alkali or alkaline metal compounds are alkali or alkaline metal carboxylate salts such as the 2-ethyl hexanoates, octanoates, nonanoates, heptanoates, neodecanoates, and naphthenates of alkali metals, and alkaline earth metals. A preferred alkali metal is K.

Examples of phosphorous-containing compounds are phosphorous compounds with the formulae $P(R)_3$ and $P(R)_3=O$, wherein each R is independently selected from hydrogen, alkyl with 1 to 10 carbon atoms, and alkoxy groups with 1 to 10 carbon atoms. Preferably, at least two R-groups are selected from either alkyl groups or alkoxy groups. Specific examples of suitable phosphorous-containing compounds are diethyl phosphate, dibutyl phosphate, tributyl phosphate, triethyl phosphate (TEP), dibutyl phosphite, and triethyl phosphate.

Acetoacetates are particularly preferred promoters. Particularly preferred is diethyl acetoacetamide. Even more preferred is a combination of diethyl acetoacetamide and potassium 2-ethyl hexanoate. Also preferred is a combination of diethyl acetoacetamide and dibutyl phosphate.

The radically curable composition may further contain nitrogen-containing bases, such as tertiary amines like triethyl amine, dimethylaniline, diethylaniline, or N,N-dimethyl-p-toludine (DMPT), polyamines like 1,2-(dimethyl amine)ethane, secondary amines like diethyl amine, ethoxylated amines like triethanol amine, dimethylamino ethanol, diethanol amine (DETA), or monoethanol amine, and aromatic amines like bipyridine.

The nitrogen-containing base is preferably used in an amount of 0.5-10 g/kg resin.

Optional additives that may be present in the radically curable composition according to the invention are fillers, pigments, inhibitors, and promoters.

In a preferred embodiment, the radically curable composition comprises a filler. Examples of fillers are quartz, sand, aluminium trihydroxide, magnesium hydroxide, chalk, calcium hydroxide, clays, and lime.

It may be desired to have a reducing agent present in the radically curable composition. Examples of reducing agents are ascorbic acid, sodium formaldehyde sulphoxylate (SFS), reducing sugars like glucose and fructose, oxalic acid, phosphines, phosphites, organic or inorganic nitrites, organic or inorganic sulphites, organic or inorganic sulphides, mercaptanes, and aldehydes, and mixtures thereof. Ascorbic acid, which term in this specification includes L-ascorbic acid and D-isoascorbic acid, is the preferred reducing agent.

The transition metal compound and one or more of the additional compounds can be added to the radically curable resin in different ways. One method involves the addition of the individual compounds to the resin, before the peroxide is added. This can be done just in advance of peroxide addition or days or weeks before that. In the latter case, we refer to a pre-accelerated resin composition, which comprises the resin and the accelerator ingredients and can be stored until further use and cure with the peroxide.

Another method involves the pre-preparation of a solution containing the transition metal compound and optionally one or more of the other compounds referred to above, which solution can be stored until further use and addition to the resin (referred to as "accelerator solution").

A pre-accelerated resin can be prepared by either adding the individual ingredients of the accelerator system to the resin or by adding these ingredients in admixture in the form of an accelerator solution.

An accelerator solution suitable for use in the processes according to the present invention may comprise, apart for the transition metal compound(s) and the optional additional compounds referred to above, one or more solvents.

Examples of suitable solvents include aliphatic hydrocarbon solvents, aromatic hydrocarbon solvents, and solvents that carry an aldehyde, ketone, ether, ester, alcohol, phosphate, or carboxylic acid group. Examples of suitable solvents are aliphatic hydrocarbon solvents such as white spirit and odourless mineral spirit (OMS), aromatic hydrocarbon solvents such naphthenes and mixtures of naphthenes and paraffins, isobutanol; pentanol; 1,2-dioximes, N-methyl pyrrolidinone, N-ethyl pyrrolidinone; dimethyl formamide (DMF); dimethyl sulphoxide (DMSO); 2,2,4-trimethyl pentanediol diisobutyrate (TxIB); esters such as dibutyl maleate, dibutyl succinate, ethyl acetate, butyl acetate, mono- and diesters of ketoglutaric acid, pyruvates, and esters of ascorbic acid such as ascorbic palmitate; aldehydes; mono- and diesters, more in particular diethyl malonate and succinates; 1,2-diketones, in particular diacetyl and glyoxal; benzyl alcohol, and fatty alcohols.

A specifically desired type of solvent is a hydroxy-functional solvent, which includes compounds of the formula $HO-(-CH_2-C(R^1)_2-(CH_2)_m-O-)_n-R^2$, wherein each $R^1$ is independently selected from the group consisting of hydrogen, alkyl groups with 1-10 carbon atoms, and hydroxyalkyl groups with 1 to 10 carbon atoms, n=1-10, m=0 or 1, and $R^2$ is hydrogen or an alkyl group with 1-10 carbon atoms. Most preferably, each $R^1$ is independently selected from H, $CH_3$, and $CH_2OH$. Examples of suitable hydroxy-functional solvents are glycols like diethylene monobutyl ether, ethylene glycol, diethylene glycol, dipropylene glycol, and polyethylene glycols, glycerol, and pentaerythritol.

The accelerator solution can be prepared by simply mixing the ingredients, optionally with intermediate heating and/or mixing steps.

If an accelerator solution is used for adding the transition metal to the resin in the process of the present invention, the accelerator solution is generally employed in amounts of at least 0.01 wt %, preferably at least 0.1 wt %, and preferably not more than 5 wt %, more preferably not more than 3 wt % of the accelerator solution, based on the weight of the resin.

Peroxides suitable for use in the process of the present invention and suitable for being present in component B of the two-component composition include inorganic peroxides and organic peroxides, such as conventionally used ketone peroxides, peroxyesters, diaryl peroxides, dialkyl peroxides, and peroxydicarbonates, but also peroxycarbonates, peroxyketals, hydroperoxides, diacyl peroxides, and hydrogen peroxide. Preferred peroxides are organic hydroperoxides, ketone peroxides, peroxyesters, and peroxycarbonates. Particularly preferred peroxides are methyl ethyl ketone peroxide and methyl isopropyl ketone peroxide.

The skilled person will understand that the peroxides can be combined with conventional additives, for instance fillers, pigments, and phlegmatizers. Examples of phlegmatizers are hydrophilic esters and hydrocarbon solvents. The amount of peroxide to be used for curing the resin is preferably at least 0.1 weight parts per hundred resin (phr), more preferably at least 0.5 phr, and most preferably at least 1 phr. The amount of peroxide is preferably not more than 8 phr, more preferably not more than 5 phr, most preferably not more than 2 phr.

In order to cure the radically curable resin, the peroxide is added to the mixture of resin, fibres, and transition metal compound, and the resulting mixture is mixed and dispersed. The curing process can be carried out at any temperature from −15° C. up to 250° C., depending on the initiator system, the accelerator system, the compounds to adapt the curing rate, and the resin composition to be cured. Preferably, it is carried out at ambient temperatures commonly used in applications such as hand lay-up, spray-up, filament winding, resin transfer moulding, vacuum injection or infusion, coating (e.g. gelcoat and standard coatings), button production, centrifugal casting, corrugated sheets or flat panels, relining systems, kitchen sinks via pouring compounds, etc. However, it can also be used in SMC, BMC, pultrusion techniques, and the like, for which temperatures up to 180° C., more preferably up to 150° C., most preferably up to 100° C., are used.

The cured composite material can be subjected to a post-cure treatment to further optimize the hardness. Such post-cure treatment is generally performed at a temperature in the range 40-180° C. for 30 min to 15 hours.

The cured compositions find use in various applications, including marine applications, chemical anchoring, roofing, construction, relining, pipes and tanks, flooring, windmill blades, laminates, automotive parts cars, trucks, trains, planes, etc.

EXAMPLES

The following materials were used in the examples below:

| | |
|---|---|
| Synolite 1967-X1 | a non-preacceleratored DCPD polyester resin (ex DSM) |
| Butanox ® M50 | methyl ethyl ketone peroxide with an active oxygen content of 8.9 wt % (50 wt % in dimethyl phthalate; ex AkzoNobel) |
| Nouryact ™ CF32 | a Fe-based accelerator solution ex AkzoNobel |
| Accelerator NL49-P | Cobalt(II) 2-ethylhexanoate, 1% Co, in solvent mixture (ex AkzoNobel) |
| inhibitor NLD-20 | 2,6-di-tert-butyl-4-methylphenol-based inhibitor ex AkzoNobel |

-continued

| | |
|---|---|
| non-woven flax 'as received' | "non-pretreated" flax containing approx 9.3 wt % water, after storage at a temperature of 13.9° C. at 71% relative humidity |
| Dried non-woven flax | flax dried in a halogen/hot air dryer for 1 hour at 105° C., resulting in a weight loss of 9.3 wt % compared to the flax "as received" |
| wet non-woven flax | flax saturated with water vapour containing approx. 14 wt % water after storage in a closed container at 20° C. and 100% RH for 96 hours. |

A closed vacuum injection mould of 30×50×0.4 cm was used to prepare test panels. Two pieces of non-woven flax of 5 mm thickness were put in the mould. Resin compositions were prepared by mixing 100 parts by weight (pbw) resin, 1 pbw accelerator solution, 1 pbw of peroxide, and 0.5 pbw of inhibitor NLD-20, injecting the mixture in a mould, and allowing the mixture to cure. The gel time was approximately 45 minutes. The mould was kept at 20° C. during cure. The resulting fibre content was approx 35 wt % in the finished composition.

A cured plate containing the Co-based accelerator and the wet flax (having a water content of 14 wt %) contained poorly wetted parts, whereas cured plates containing the Fe-based accelerator and the plate containing the Co-based accelerator in combination with dried flax looked fine.

Test strips were taken from the test panels and the tear strength, the elongation at break, and the Young's modulus were measured according to ISO 527 on an Instron 3367 instrument.

| example | flax | metal | Tensile strength (MPa) | | Elongation at break (%) | | Young's modulus | |
|---|---|---|---|---|---|---|---|---|
| | | | width | length | width | length | width | length |
| 1 (comp) | dried | Co | 32.4 | 52.8 | 1.2 | 1.6 | 4.9 | 6.9 |
| 2 (comp) | dried | Fe | 32.6 | 51.8 | 1.5 | 1.7 | 4.2 | 6.1 |
| 3 (comp) | wet | Co | $X^a$ | $X^a$ | $X^a$ | $X^a$ | $X^a$ | $X^a$ |
| 4 | wet | Fe | 32.1 | 60.8 | 2.8 | 2.5 | 3.5 | 5.3 |

$^a$X means: incomplete cure

These data show that the cured panel containing the Fe-containing accelerator and the wet flax had a higher tear strength than the panels obtained with dried flax (Co or Fe-accelerated), especially in the longitudinal direction.

Also the elongation at break was higher for this sample than for the other samples, while the stiffness (Young's modulus) was less.

The invention claimed is:

1. A process for the preparation of a fibre-reinforced composite material comprising curing a radically curable resin by contacting (i) a radically curable resin, (ii) fibres with a total water content of 0.5-20 wt %, based on the total weight of fibres, (iii) at least one transition metal compound selected from the group consisting of salts and complexes of manganese, iron, and copper compounds, and (iv) a peroxide, wherein the resin is an unsaturated polyester resin, a vinyl ester resin, or a (meth)acrylate resin.

2. The process according to claim 1, wherein the fibres are natural fibres selected from the group consisting of flax, jute, kenaf, industrial hemp, flax, bamboo, and ramie.

3. The process according to claim 1, wherein the transition metal compound is a copper compound, an iron compound, or a combination thereof.

4. The process according to claim 1, wherein the peroxide is selected from the group consisting of organic hydroperoxides, ketone peroxides, peroxycarbonates, and peroxyesters.

5. The process according to claim 4, wherein the peroxide is a ketone peroxide.

6. The process according to claim 1, wherein the radically curable resin composition is prepared by adding the transition metal compound to the resin in the form of a solution comprising, apart from the transition metal compound, an alkali or alkaline earth metal compound, a phosphorous-containing compound, and/or a 1,3-diketone.

7. The process according to claim 1, wherein the transition metal compound is added to the resin in an amount of 1-75 mmol/kg resin.

* * * * *